Sept. 4, 1962
H. F. RUNGE
3,052,144
MATERIAL CUTTING APPARATUS
Filed May 4, 1959
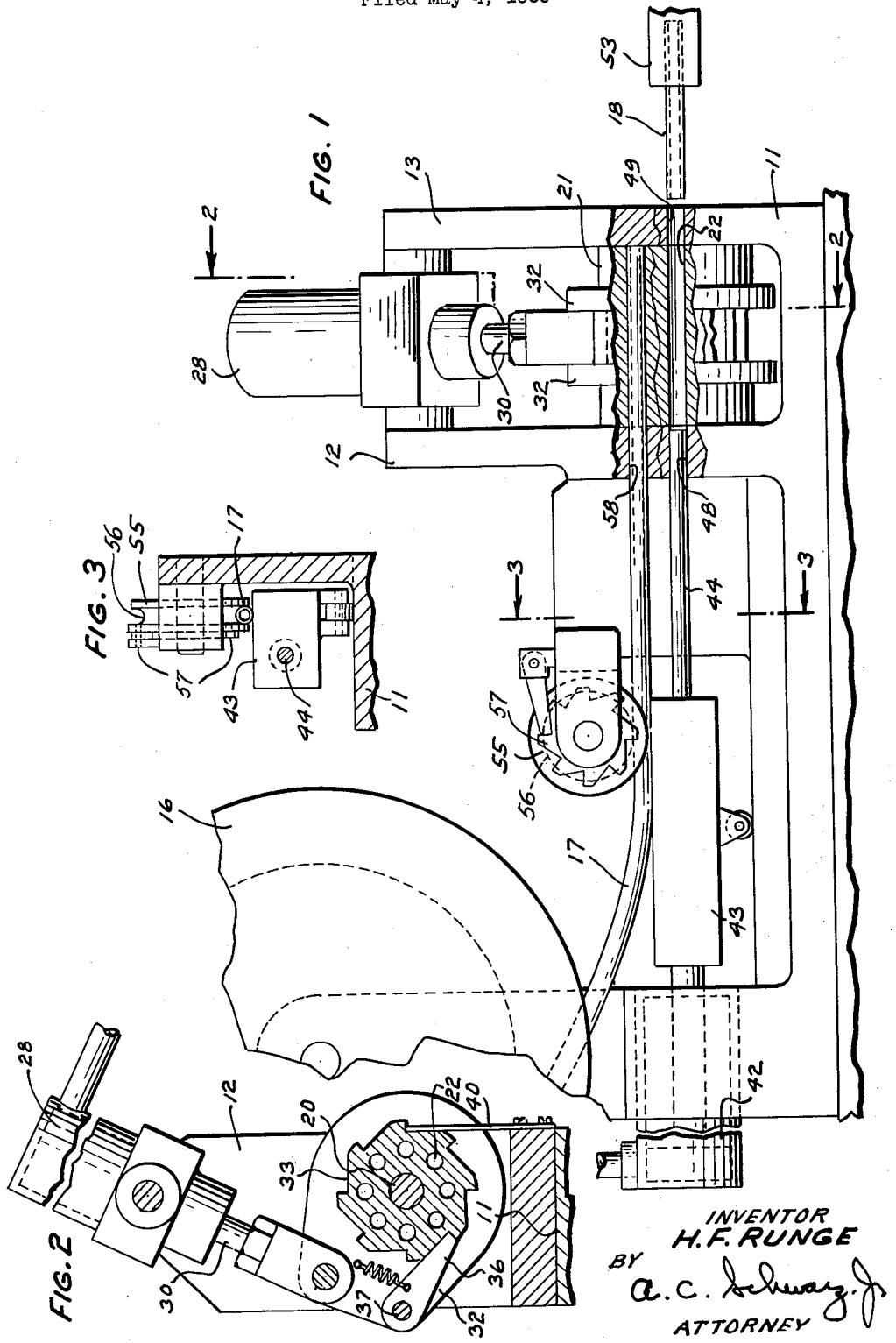
INVENTOR
*H. F. RUNGE*
BY
*a.c. Schwarz, Jr.*
ATTORNEY

United States Patent Office 3,052,144
Patented Sept. 4, 1962

3,052,144
MATERIAL CUTTING APPARATUS
Heinz F. Runge, Brookfield, Ill., assignor to Western Electric Company, Incorporated, New York, N.Y., a corporation of New York
Filed May 4, 1959, Ser. No. 810,749
5 Claims. (Cl. 83—123)

This invention relates to material cutting apparatus and more particularly to devices for severing lengths of insulating tubing.

In the manufacture of a certain type of splicing sleeve, a length of tubular insulating material is inserted into a tubular metallic member or sleeve which is later crimped to hold the ends of a pair of conductors therein. One of the problems of assembling the length of tubular insulating material in the metallic sleeve has been the difficulty of handling the lengths between the cutting of each length from a continuous supply and the inserting of the length into the sleeve.

One of the objects of this invention is to provide a novel and improved material cutting apparatus.

Another object of this invention is to provide a device for cutting lengths of tubular insulation from a supply and discharging these lengths from the device.

A further object of this invention is to provide a device having a revolver-like cylinder which is actuated to sever a length from a strip of material and to align the severed length with an element for removing the severed length from the cylinder.

One embodiment of the present invention may include a revolver-type cylinder having a plurality of longitudinal bores adapted to receive an end of insulating tubing. The end of the tubing is advanced into one of the bores in the cylinder, whereupon the cylinder is rotated through a short arc. A portion of the device cooperates with the cylinder to sever the length of tubing positioned in the bore. During the advancement of the tubing into the bore, a push rod engages a previously severed length of tubing in another bore in the cylinder and forces it into a metallic sleeve.

Other objects and advantages of the invention will become apparent when the following detailed description is read in conjunction with the appended drawings, in which:

FIG. 1 is a fragmentary front view of a device embodying the principles of the invention and illustrating the general construction of the device;

FIG. 2 is a fragmentary sectional view taken on line 2—2 of FIG. 1 showing the cross-sectional configuration of a revolver-type cylinder of the device and also showing the mechanism by which the cylinder is actuated; and FIG. 3 is a cross-sectional view taken on line 3—3 of FIG. 1 illustrating the manner in which the insulating tubing is held between a roller and a movable block for advancement.

Referring now in detail to the drawings, a base 11 having a pair of spaced, vertically extending flanges 12 and 13 is shown supporting a reel 16 carrying a continuous supply of tubing 17 of an insulating material. The tubing 17 is to be cut into short lengths and inserted into metallic sleeves 18 which will ultimately be used as splicing sleeves.

A shaft 20 (FIG. 2) rotatably supports a revolver-type cylinder 21 positioned between the flanges 12 and 13 and having a plurality of longitudinal bores 22 equidistantly spaced radially from the axis of rotation of the shaft 20. Each bore is of a size adapted to receive the tubing 17.

An air cylinder 28 secured between the flanges 12 and 13 is provided with a piston rod 30 which is pivotally attached between a pair of plates 32 rotatably mounted on the cylinder 21. A central portion 33 of the cylinder 21 between the flanges 12 and 13 is provided with a plurality of spaced peripheral teeth having a configuration best illustrated in FIG. 2. A spring loaded pawl 36 mounted on a pin 37 between the plates 32 engages the teeth on the central portion 33 of the cylinder 21 for rotating this cylinder counterclockwise (FIG. 2) when the air cylinder 28 is actuated. A spring 40 secured to the base 11 engages the teeth of the cylinder 21 to prevent backward rotation thereof.

A second air cylinder 42 mounted on the base 11 operates a roller supported block 43 and a push rod 44 which is adapted to extend through apertures 48 and 49 in the flanges 12 and 13, respectively, and to force a length of tubing from the cylinder 21 through the aperture 49 and into the tubular metallic sleeve 18 held by an indexing table 53 of a well-known type. The indexing table 53 is operated in a well-known manner.

A roller 55 having a peripheral groove 56 of substantially circular cross-section for receiving the tubing 17 is rotatably mounted on the base 11 for cooperation with the block 43. A ratchet mechanism 57 of a well-known type including teeth attached to the roller 55 and engaged by a pivoted spring biased pawl on the base 11, insures that this roller can rotate in only one direction, that is, the direction in which the tubing 17 is advanced. During the advance stroke of the block 43, the tubing 17 is moved through an aperture 58 in the flange 12 and into one of the bores 22 in alignment with the aperture 58. During the return stroke of the block 43, the roller 55 is held stationary by the ratchet mechanism and the block 43 slides to the left along the tubing 17. Because of the configuration of the groove 56, slippage takes place between the tubing 17 and the block 43, rather than between the tubing and the roller 55. This prevents a withdrawal of the tubing 17 from the bore 22 in the cylinder 21.

In operation of the device, the air cylinder 42 is actuated to advance the block 43 and the push rod 44. Frictional engagement of the block 43 with the tubing 17 advances the tubing until its leading end extends through a bore 22 in the cylinder 21 and engages the flange 13. At this point the insulation is stopped by its engagement with the flange 13 and the block 43 continues to move until it engages the flange 12, at which point the end of the push rod 44 is adjacent to the sleeve 18. The air cylinder 42 is then actuated to withdraw the block 43 and the push rod 44. During this return stroke the ratchet mechanism prevents rotation of the roller 55 in order that the tubing 17 will not be withdrawn from the bore 22.

The air cylinder 28 is then actuated to rotate the plates 32 on the cylinder 21 in a counterclockwise direction (FIG. 2). During this movement the pawl 36, engaging a tooth on the central portion 33 of the cylinder 21, causes the cylinder to rotate 45°. With this movement, the flange 12 and the cylinder 21 cooperate to sever from the tubing 17 a length of tubing equal to the length of the bore 22. At the end of the movement of the cylinder 21, the severed length of tubing is in alignment with the push rod 44. When the air cylinder 42 is again operated, the push rod 44 will force this length of tubing through the aperture 49 and into the sleeve 18.

Other sleeves 18 are advanced one at a time into work position and the above procedure is repeated.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for cutting lengths of tubing which comprises, a pair of spaced flanges, a cylinder rotatably mounted between said flanges with the ends of said cylinder in abutting engagement with said flanges, said cylinder having a plurality of axial bores therethrough equidistantly spaced from the axis of rotation of said cylinder for receiving tubing, one of said flanges having a tubing feed aperture therethrough arranged to be aligned axially with the bores in said cylinder in succession, said one flange having another aperture therethrough axially aligned with a tubing discharge aperture in the other flange and arranged to be aligned axially with the bores in said cylinder in succession, a reciprocating member mounted for movement between an advanced and a retracted position, a guide member for holding tubing in engagement with said reciprocating member as said reciprocating member moves to its advanced position whereby said reciprocating member advances tubing through said feed aperture into an aligned axial bore in said cylinder and against said other flange, means for preventing retraction of the tubing when said reciprocating member moves to its retracted position, means for rotating said cylinder whereby said cylinder and said one flange cooperate to sever a length of tubing advanced into said cylinder by said reciprocating member, and a push rod on said reciprocating member in axial alignment with the aligned apertures in said flanges for ejecting a cut length of tubing through the discharge aperture in said other flange from a bore in said cylinder aligned therewith simultaneously upon each feeding of a length of tubing through said feed aperture by said reciprocating member.

2. A device for cutting lengths of tubing which comprises, a pair of spaced flanges, a cylinder rotatably mounted between said flanges with the ends of said cylinder in abutting engagement with said flanges, said cylinder having a plurality of axial bores therethrough equidistantly spaced from the axis of rotation of said cylinder for receiving tubing, one of said flanges having a tubing feed aperture therethrough arranged to be aligned axially with the bores in said cylinder in succession, said one flange having another aperture therethrough axially aligned with a tubing discharge aperture in the other flange and arranged axially with the bores in said cylinder in succession, a reciprocating member mounted for movement between an advanced and a retracted position, a roller adjacent said reciprocating member including a pair of spaced apart peripheral flanges for receiving tubing therebetween in engagement with said roller, said roller being operative to hold tubing in engagement with said reciprocating member as said reciprocating member moves to its advanced position whereby said reciprocating member advances tubing through said feed aperture into an aligned axial bore in said cylinder and against said other flange, means for preventing rotation of said roller as said reciprocating member moves to its retracted position whereby said roller prevents retraction of the tubing by said reciprocating member, means for rotating said cylinder whereby said cylinder and said one flange cooperate to sever a length of tubing advanced into said cylinder by said reciprocating member, and a push rod on said reciprocating member in axial alignment with the aligned apertures in said flanges for ejecting a cut length of tubing through the discharge aperture in said other flange from a bore in said cylinder aligned therewith simultaneously upon each feeding of a length of tubing through said feed aperture by said reciprocating member.

3. A device for cutting lengths of tubing which comprises, a pair of spaced flanges, a cylinder rotatably mounted between said flanges with the ends of said cylinder in abutting engagement with said flanges, said cylinder having a plurality of axial bores therethrough equidistantly spaced from the axis of rotation of said cylinder for receiving tubing, one of said flanges having a tubing feed aperture therethrough arranged to be aligned axially with the bores in said cylinder in succession, said one flange having another aperture therethrough axially aligned with a tubing discharge aperture in the other flange and arranged to be aligned axially with the bores in said cylinder in succession, a reciprocating member mounted for movement between an advanced and a retracted position, a roller adjacent said reciprocating member including a pair of spaced apart peripheral flanges for receiving tubing therebetween in engagement with said roller, said roller being operative to hold tubing in engagement with said reciprocating member as said reciprocating member moves to its advanced position whereby said reciprocating member advances tubing through said feed aperture into an aligned axial bore in said cylinder and against said other flange, means for preventing rotation of said roller as said reciprocating member moves to its retracted position whereby said roller prevents retraction of the tubing by said reciprocating member, a pair of spaced plates rotatably mounted on said cylinder, a ratchet on said cylinder between said spaced plates, a spring biased pawl pivotally mounted between said plates and engaged with said ratchet, a ram pivotally mounted between said flanges and pivotally connected to said spaced plates for rotating said plates and said cylinder in one direction whereby said cylinder and said one flange cooperate to sever a length of tubing advanced into said cylinder by said reciprocating member, means for preventing rotation of said cylinder in the reverse direction, and a push rod on said reciprocating member in axial alignment with the aligned apertures in said flanges for ejecting a cut length of tubing through the discharge aperture in said other flange from a bore in said cylinder aligned therewith simultaneously upon each feeding of a length of tubing through said feed aperture by said reciprocating member.

4. In a device for cutting tubing to predetermined lengths and including a tubing feed means and an ejector means for ejecting cut lengths of tubing from the device, the improvement which comprises, a pair of spaced flanges, a cylinder rotatably mounted between said flanges with the ends of said cylinder in abutting engagement with said flanges, said cylinder having a plurality of axial bores therethrough equidistantly spaced from the axis of rotation of said cylinder for receiving tubing, one of said flanges having a tubing feed aperture therethrough arranged to be aligned axially with the bores in said cylinder in succession, said one flange having another aperture therethrough for receiving the ejector means and axially aligned with a tubing discharge aperture in the other flange, the axially aligned apertures in said flanges being arranged to be aligned axially with the bores in said cylinder in succession, a pair of spaced plates rotatably mounted on said cylinder, a ratchet on said cylinder between said spaced plates, a spring biased pawl pivotally mounted between said plates and engaged with said ratchet, a ram pivotally mounted between said flanges and pivotally connected to said spaced plates for rotating said plates and said cylinder in one direction whereby said cylinder and said one flange cooperate to sever a length of tubing advanced into said cylinder by the feed means, and means for preventing rotation of said cylinder in the reverse direction.

5. In a device for cutting tubing into predetermined lengths and including a rotatable cylinder having a plurality of axial bores therethrough equidistantly spaced from the axis of rotation of said cylinder for receiving tubing, the improvement which comprises, a reciprocating member mounted for movement between an advanced and a retracted position, a roller adjacent said reciprocating member including a pair of spaced apart peripheral flanges for receiving tubing therebetween in engagement with said roller, said roller being operative to hold tubing in engagement with said reciprocating member as said reciprocating member moves to its advanced position whereby said reciprocating member advances tubing into an axial bore in the cylinder means for preventing rotation of said roller as said reciprocating member moves to its retracted position whereby said roller prevents retraction of the tubing by said reciprocating member, and a push rod on said reciprocating member arranged to be aligned axially with the bores in the cylinder in succession for ejecting a cut length of tubing from a bore in the cylinder aligned therewith simultaneously upon each feeding of a length of tubing by said reciprocating member.

References Cited in the file of this patent

UNITED STATES PATENTS

| | | |
|---|---|---|
| 749,415 | Winnersten | Jan. 12, 1904 |
| 771,752 | Stafford | Oct. 4, 1904 |
| 2,746,128 | Barron | May 22, 1956 |
| 2,779,038 | MacBlane | Jan. 29, 1957 |
| 2,844,979 | Schiller | July 29, 1958 |